United States Patent
Yu et al.

(10) Patent No.: US 10,542,286 B2
(45) Date of Patent: Jan. 21, 2020

(54) MULTI-LAYER VIDEO ENCODER/DECODER WITH BASE LAYER INTRA MODE USED FOR ENHANCEMENT LAYER INTRA MODE PREDICTION

(71) Applicant: General Instrument Corporation, Horsham, PA (US)

(72) Inventors: Yue Yu, San Diego, CA (US); Limin Wang, San Diego, CA (US); Jian Lou, Cupertino, CA (US)

(73) Assignee: ARRIS Enterprise LLC, Suwanee, GA (US)

( * ) Notice: Subject to any disclaimer, the term of this patent is extended or adjusted under 35 U.S.C. 154(b) by 478 days.

(21) Appl. No.: 13/863,333

(22) Filed: Apr. 15, 2013

(65) Prior Publication Data

US 2014/0169458 A1      Jun. 19, 2014

Related U.S. Application Data

(60) Provisional application No. 61/739,672, filed on Dec. 19, 2012, provisional application No. 61/785,828, filed on Mar. 14, 2013.

(51) Int. Cl.
*H04N 19/59* (2014.01)

(52) U.S. Cl.
CPC .................... *H04N 19/59* (2014.11)

(58) Field of Classification Search
CPC ............. H04N 19/00569; H04N 19/33; H04N 19/463; H04N 19/59
USPC .................................................... 375/240.12
See application file for complete search history.

(56) References Cited

U.S. PATENT DOCUMENTS

| 8,374,239 | B2 * | 2/2013 | Yin ...................... | H04N 19/176 |
| | | | | 375/240.12 |
| 8,437,396 | B2 * | 5/2013 | Qiu et al. ................. | 375/240.16 |
| 9,179,145 | B2 * | 11/2015 | Hong ................... | H04N 19/197 |
| 2006/0104354 | A1 | 5/2006 | Han et al. | |
| 2006/0153295 | A1 | 7/2006 | Wang et al. | |
| 2008/0101470 | A1 * | 5/2008 | Hong ................... | H04N 21/242 |
| | | | | 375/240.14 |
| 2009/0296821 | A1 * | 12/2009 | Henocq ................ | H04N 19/159 |
| | | | | 375/240.16 |
| 2013/0114707 | A1 * | 5/2013 | Seregin et al. .......... | 375/240.12 |

(Continued)

FOREIGN PATENT DOCUMENTS

WO        2007/008286 A1        1/2007

OTHER PUBLICATIONS

Zhijie Zhao et al, Inter-layer intra prediction mode coding for the scalable extension of HEVC, JCT-VC, 11th meeting Oct. 10-19, 2012 (Year: 2012).*

(Continued)

*Primary Examiner* — Sath V Perungavoor
*Assistant Examiner* — Yong Joon Kwon
(74) *Attorney, Agent, or Firm* — Chernoff, Vilhauer, McClung & Stenzel LLP

(57) ABSTRACT

A multi-layer encoder/decoder system is provided that uses base layer intra mode for enhancement layer intra mode prediction. The encoder provides the base layer intra mode in the base layer of a two layer video encoder, and uses the base layer intra mode as one of a plurality of most probable modes (MPMs). Then in determining the enhancement layer intra mode, the MPMs are used.

8 Claims, 10 Drawing Sheets

(56) References Cited

U.S. PATENT DOCUMENTS

| | | | | |
|---|---|---|---|---|
| 2013/0142259 A1* | 6/2013 | Lim | ................ | H04N 19/00545 |
| | | | | 375/240.12 |
| 2013/0188695 A1* | 7/2013 | Maani | .................... | H04N 19/70 |
| | | | | 375/240.12 |
| 2014/0003509 A1* | 1/2014 | Hong | ................... | H04N 19/197 |
| | | | | 375/240.12 |
| 2014/0064360 A1* | 3/2014 | Rapaka et al. | ........... | 375/240.02 |
| 2014/0092978 A1* | 4/2014 | Bugdayci | ......... | H04N 19/00684 |
| | | | | 375/240.16 |

OTHER PUBLICATIONS

PCT Search Report & Written Opinion, Re: Application #PCT/US2013/075991; dated Apr. 8, 2014.

B. Bross, et al., "High efficiency video coding (HEVC) text specification draft 8," JCTVC-J1003_d7, Jul. 2012.

* cited by examiner

MULTI-LAYER VIDEO ENCODER/DECODER WITH BASE LAYER INTRA MODE USED FOR ENHANCEMENT LAYER INTRA MODE PREDICTION

CROSS-REFERENCE TO RELATED APPLICATIONS

The present application claims the benefit of U.S. provisional patent application No. 61/739,672, entitled "USE BASE LAYER INTRA PREDICTION MODE FOR ENHANCEMENT LAYER INTRA MODE PREDICTION" filed Dec. 19, 2012 and U.S. provisional patent application No. 61/785,828, entitled "DEVICES AND METHODS FOR USING BASE LAYER INTRA PREDICTION MODE FOR ENHANCEMENT LAYER INTRA MODE PREDICTION" filed Mar. 14, 2013, and is related to U.S. non-provisional patent application Ser. No. 13/863,329 entitled "DEVICES AND METHODS FOR USING BASE LAYER MOTION VECTOR FOR ENHANCEMENT LAYER MOTION VECTOR PREDICTION" filed on Apr. 15, 2013, all of which are incorporated by reference in their entirety.

FIELD

The disclosure relates generally to the field of video coding, and more specifically to systems, devices and methods for using base layer intra prediction mode for enhancement layer intra mode prediction.

BACKGROUND

Video compression uses block processing for many operations. In block processing, a block of neighboring pixels is grouped into a coding unit and compression operations treat this group of pixels as one unit to take advantage of correlations among neighboring pixels within the coding unit. Block-based processing often includes prediction coding and transform coding. Transform coding with quantization is a type of data compression which is commonly "lossy" as the quantization of a transform block taken from a source picture often discards data associated with the transform block in the source picture, thereby lowering its bandwidth requirement but often also resulting in quality loss in reproducing of the original transform block from the source picture.

MPEG-4 AVC, also known as H.264, is an established video compression standard that uses transform coding in block processing. In H.264, a picture is divided into macroblocks (MBs) of 16×16 pixels. Each MB is often further divided into smaller blocks. Blocks equal in size to or smaller than a MB are predicted using intra-/inter-picture prediction, and a spatial transform along with quantization is applied to the prediction residuals. The quantized transform coefficients of the residuals are commonly encoded using entropy coding methods (e.g., variable length coding or arithmetic coding). Context Adaptive Binary Arithmetic Coding (CABAC) was introduced in H.264 to provide a substantially lossless compression efficiency by combining an adaptive binary arithmetic coding technique with a set of context models. Context model selection plays a role in CABAC in providing a degree of adaptation and redundancy reduction. H.264 specifies two kinds of scan patterns over 2D blocks. A zigzag scan is used for pictures coded with progressive video compression techniques and an alternative scan is for pictures coded with interlaced video compression techniques.

HEVC (High Efficiency Video Coding), an international video coding standard developed to succeed H.264, extends transform block sizes to 16×16 and 32×32 pixels to benefit high definition (HD) video coding. HEVC may also use a variety of scan patterns, including diagonal scan, vertical scan and horizontal scan.

Within video compression standards such as HEVC, coding mechanisms for reducing spatial and temporal redundancies are desirable. Ongoing efforts are directed at increasing the efficiencies of encoders and decoders (codecs), which compress and decompress, respectively, video data streams. Because a purpose of codecs is to reduce the size of digital video frames, thereby promoting the efficient storage and communication of video, development in codec hardware and encoding/decoding processes continues.

BRIEF SUMMARY

Accordingly, there is provided herein systems and methods for using base layer intra prediction mode for enhancement layer intra mode prediction.

In a first aspect, a method of providing enhancement layer intra mode prediction is disclosed, the method comprising: (a) providing base layer intra mode; (b) using the base layer intra mode as one of a plurality of most probable modes (MPMs); and (c) determining enhancement layer intra mode based in part on MPMs. In an embodiment of the first aspect, the enhancement layer intra mode is the same as the base layer intra mode. In an embodiment of the first aspect, a flag is used to specify the enhancement layer intra mode is the same as the base layer intra mode. In an embodiment of the first aspect, the MPMs include a left neighboring block and an above neighboring block. In an embodiment of the first aspect, the method is implemented on a computer having a processor and a memory coupled to said processor, wherein at least some of steps (a)-(c) are performed using said processor.

In a second aspect, a method of providing enhancement layer intra mode prediction is disclosed, the method comprising: (a) providing base layer intra mode; (b) adding the base layer intra mode to a set of a plurality of most probable modes (MPMs); and (c) determining enhancement layer intra mode based in part on MPMs. In an embodiment of the second aspect, the method further comprises: (d) selecting two or more MPMs from the set of a plurality of MPMs to use in step (c). In an embodiment of the second aspect, the enhancement layer intra mode is the same as the base layer intra mode. In an embodiment of the second aspect, a flag is used to specify the enhancement layer intra mode is the same as the base layer intra mode. In an embodiment of the second aspect, the method is implemented on a computer having a processor and a memory coupled to said processor, wherein at least some of steps (a)-(c) are performed using said processor.

In a third aspect, a method of using base layer Intra mode prediction for enhancement layer intra prediction is disclosed, the method comprising: (a) providing base layer intra mode; (b) saving a portion of the base layer intra mode, the saved portion being representative of the base layer intra mode; and (c) using the saved portion of the base layer intra mode for enhancement layer prediction. In an embodiment of the third aspect, the saved portion of the base layer intra mode is a 4×4 block. In an embodiment of the third aspect, the block is one of: an Intra mode block, an Inter mode block, and combinations thereof. In an embodiment of the third aspect, the block is the top-left 4×4 block in a 16×16 block. In an embodiment of the third aspect, the block is the bottom-right 4×4 block in a 16×16 block. In an embodiment of the third aspect, step (b) is saved in memory. In an embodiment of the third aspect, the method is implemented on a computer having a processor and a memory coupled to said processor, wherein at least some of steps (a)-(c) are performed using said processor.

In a fourth aspect, an apparatus for decoding a video bitstream having a plurality of pictures is disclosed, the apparatus comprising a video decoder configured to: (a) receive a video bitstream; (b) derive processed video data from the bitstream, wherein the processed video data includes a base layer intra mode; (c) save a portion of the base layer intra mode, the saved portion being representative of the base layer intra mode; and (d) use the saved portion of the base layer intra mode for enhancement layer prediction. In an embodiment of the fourth aspect, the apparatus comprises at least one of: an integrated circuit; a microprocessor; and a wireless communication device that includes the video decoder.

In a fifth aspect, an apparatus for decoding a video bitstream having a plurality of pictures is disclosed, the apparatus comprising a video decoder configured to: (a) receive a video bitstream; (b) derive processed video data from the bitstream, wherein the processed video data includes a base layer intra mode; (c) use the base layer intra mode as one of a plurality of most probable modes (MPMs); and (d) determine enhancement layer intra mode based in part on MPMs. In an embodiment of the fifth aspect, the apparatus comprises at least one of: an integrated circuit; a microprocessor; and a wireless communication device that includes the video decoder.

In a sixth aspect, an apparatus for decoding a video bitstream having a plurality of pictures is disclosed, the apparatus comprising a video decoder configured to: (a) receive a video bitstream; (b) derive processed video data from the bitstream, wherein the processed video data includes a base layer intra mode; (c) add the base layer intra mode to a set of a plurality of most probable modes (MPMs); and (d) determine enhancement layer intra mode based in part on MPMs. In an embodiment of the sixth aspect, the apparatus comprises at least one of: an integrated circuit; a microprocessor; and a wireless communication device that includes the video decoder.

In a seventh aspect, an apparatus for encoding video data representing a plurality of pictures is disclosed, the apparatus comprising a video encoder configured to: (a) provide base layer intra mode; (b) use the base layer intra mode as one of a plurality of most probable modes (MPMs); and (c) determine enhancement layer intra mode based in part on MPMs. In an embodiment of the seventh aspect, the apparatus comprises at least one of: an integrated circuit; a microprocessor; and a wireless communication device that includes the video encoder.

In an eighth aspect, an apparatus for encoding video data representing a plurality of pictures is disclosed, the apparatus comprising a video encoder configured to: (a) provide base layer intra mode; (b) add the base layer intra mode to a set of a plurality of most probable modes (MPMs); and (c) determine enhancement layer intra mode based in part on MPMs. In an embodiment of the eighth aspect, the apparatus comprises at least one of: an integrated circuit; a microprocessor; and a wireless communication device that includes the video encoder.

In a ninth aspect, an apparatus for encoding video data representing a plurality of pictures is disclosed, the apparatus comprising a video encoder configured to: (a) provide base layer intra mode; (b) save a portion of the base layer intra mode, the saved portion being representative of the base layer intra mode; and (c) use the saved portion of the base layer intra mode for enhancement layer prediction. In an embodiment of the ninth aspect, the apparatus comprises at least one of: an integrated circuit; a microprocessor; and a wireless communication device that includes the video encoder.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

In this disclosure, the term "coding" refers to encoding that occurs at the encoder or decoding that occurs at the decoder. Similarly, the term coder refers to an encoder, a decoder, or a combined encoder/decoder (CODEC). The terms coder, encoder, decoder and CODEC all refer to specific machines designed for the coding (encoding and/or decoding) of image and/or video data consistent with this disclosure. Image and video data generally consist of three components-one for a luma component which represents brightness of a pixel and two for chroma components which represent color information of a pixel.

The present discussion begins with a very brief overview of some terms and techniques known in the art of digital image compression. This overview is not meant to teach the known art in any detail. Those skilled in the art know how to find greater details in textbooks and in the relevant standards.

An example of a video system in which an embodiment of the disclosure may be used will now be described. It is understood that elements depicted as function blocks in the figures may be implemented as hardware, software, or a combination thereof. Furthermore, embodiments of the disclosure may also be employed on other systems, such as on a personal computer, smartphone or tablet computer.

Figure 1A:
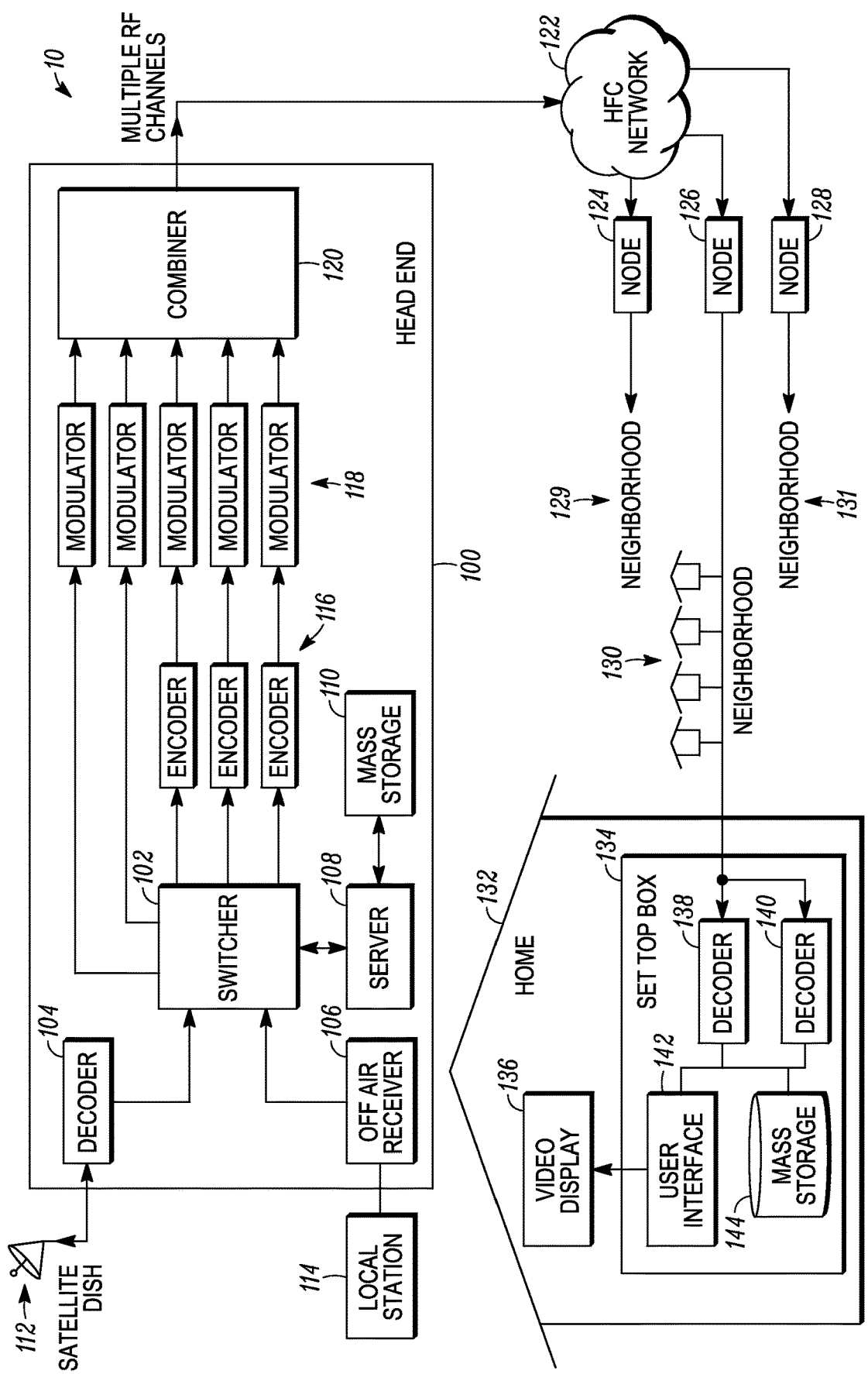
FIG. 1A is a video system in which the various embodiments of the disclosure may be used.

Referring to FIG. 1A, a video system, generally labeled 10, may include a head end 100 of a cable television network. The head end 100 may be configured to deliver video content to neighborhoods 129, 130 and 131. The head end 100 may operate within a hierarchy of head ends, with the head ends higher in the hierarchy generally having greater functionality. The head end 100 may be communicatively linked to a satellite dish 112 and receive video signals for non-local programming from it. The head end 100 may also be communicatively linked to a local station 114 that delivers local programming to the head end 100. The head end 100 may include a decoder 104 that decodes the video signals received from the satellite dish 112, an off-air receiver 106 that receives the local programming from the local station 114, a switcher 102 that routes data traffic among the various components of the head end 100, encoders 116 that encode video signals for delivery to customers, modulators 118 that modulate signals for delivery to customers, and a combiner 120 that combines the various signals into a single, multi-channel transmission.

The head end 100 may also be communicatively linked to a hybrid fiber cable (HFC) network 122. The HFC network 122 may be communicatively linked to a plurality of nodes 124, 126, and 128. Each of the nodes 124, 126, and 128 may be linked by coaxial cable to one of the neighborhoods 129, 130 and 131 and deliver cable television signals to that neighborhood. One of the neighborhoods 130 of FIG. 1A is shown in more detail. The neighborhood 130 may include a number of residences, including a home 132 shown in FIG. 1A. Within the home 132 may be a set-top box 134 communicatively linked to a video display 136. The set-top box 134 may include a first decoder 138 and a second decoder 140. The first and second decoders 138 and 140 may be communicatively linked to a user interface 142 and a mass storage device 144. The user interface 142 may be communicatively linked to the video display 136.

During operation, head end 100 may receive local and nonlocal programming video signals from the satellite dish 112 and the local station 114. The nonlocal programming video signals may be received in the form of a digital video stream, while the local programming video signals may be received as an analog video stream. In some embodiments, local programming may also be received as a digital video stream. The digital video stream may be decoded by the decoder 104 and sent to the switcher 102 in response to customer requests. The head end 100 may also include a server 108 communicatively linked to a mass storage device 110. The mass storage device 110 may store various types of video content, including video on demand (VOD), which the server 108 may retrieve and provide to the switcher 102. The switcher 102 may route local programming directly to the modulators 118, which modulate the local programming, and route the non-local programming (including any VOD) to the encoders 116. The encoders 116 may digitally encode the non-local programming. The encoded non-local programming may then be transmitted to the modulators 118. The combiner 120 may be configured to receive the modulated analog video data and the modulated digital video data, combine the video data and transmit it via multiple radio frequency (RF) channels to the HFC network 122.

The HFC network 122 may transmit the combined video data to the nodes 124, 126 and 128, which may retransmit the data to their respective neighborhoods 129, 130 and 131. The home 132 may receive this video data at the set-top box 134, more specifically at the first decoder 138 and the second decoder 140. The first and second decoders 138 and 140 may decode the digital portion of the video data and provide the decoded data to the user interface 142, which then may provide the decoded data to the video display 136.

The encoders 116 and the decoders 138 and 140 of FIG. 1A (as well as all of the other steps and functions described herein) may be implemented as computer code comprising computer readable instructions stored on a computer readable storage device, such as memory or another type of storage device. The computer code may be executed on a computer system by a processor, such as an application-specific integrated circuit (ASIC), or other type of circuit. For example, computer code for implementing the encoders 116 may be executed on a computer system (such as a server) residing in the headend 100. Computer code for the decoders 138 and 140, on the other hand, may be executed on the set-top box 134, which constitutes a type of computer system. The code may exist as software programs comprised of program instructions in source code, object code, executable code or other formats. It should be appreciated that the computer code for the various components shown in FIG. 1A may reside anywhere in system 10 or elsewhere (such as in a cloud network), that is determined to be desirable or advantageous. Furthermore, the computer code may be located in one or more components, provided the instructions may be effectively performed by the one or more components.

Figure 1B:
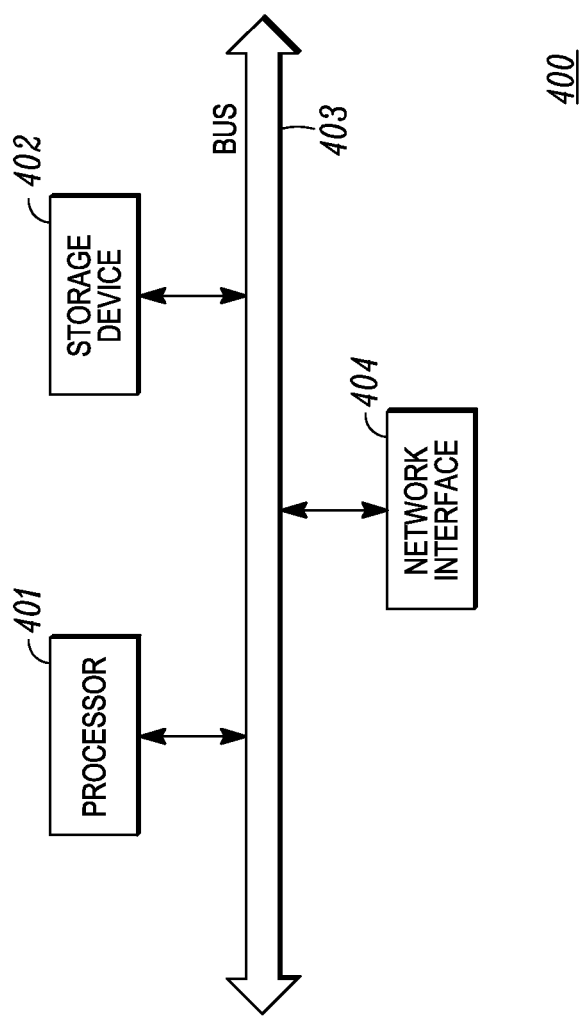
FIG. 1B is a computer system on which embodiments of the disclosure may be implemented.

FIG. 1B shows an example of a computer system on which computer code for the encoders 116 and the decoders 138 and 140 may be executed. The computer system, generally labeled 400, includes a processor 401, or processing circuitry, that may implement or execute software instructions performing some or all of the methods, functions and other steps described herein. Commands and data from processor 401 may be communicated over a communication bus 403, for example. Computer system 400 may also include a computer readable storage device 402, such as random access memory (RAM), where the software and data for processor 401 may reside during runtime. Storage device 402 may also include non-volatile data storage. Computer system 400 may include a network interface 404 for connecting to a network. Other known electronic components may be added or substituted for the components depicted in the computer system 400. The computer system 400 may reside in the headend 100 and execute the encoders 116, and may also be embodied in the set-top box 134 to execute the decoders 138 and 140. Additionally, the computer system 400 may reside in places other than the headend 100 and the set-top box 134, and may be miniaturized so as to be integrated into a smartphone or tablet computer.

Video encoding systems may achieve compression by removing redundancy in the video data, e.g., by removing those elements that can be discarded without greatly adversely affecting reproduction fidelity. Because video signals take place in time and space, most video encoding systems exploit both temporal and spatial redundancy present in these signals. Typically, there is high temporal correlation between successive frames. This is also true in the spatial domain for pixels which are close to each other. Thus, high compression gains are achieved by carefully exploiting these spatio-temporal correlations.

Figure 2A:
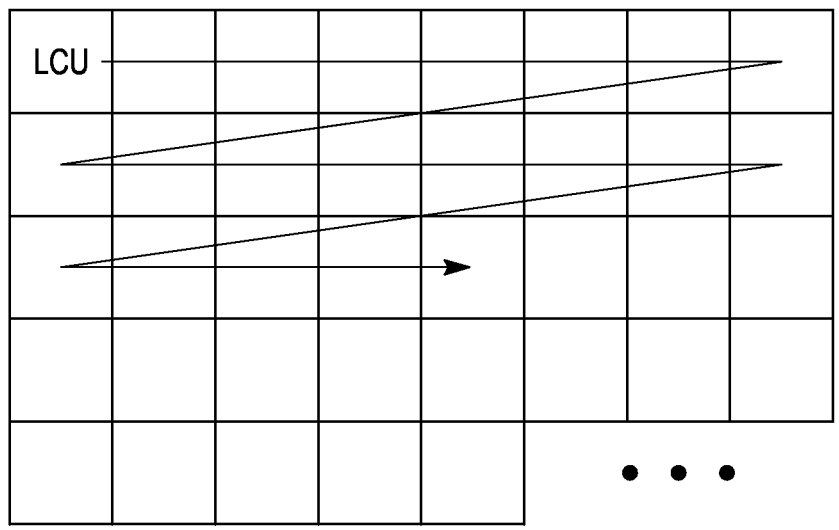
FIGS. 2A, 2B, 3A and 3B illustrate certain video encoding principles according to embodiments of the disclosure.
Figure 3A:
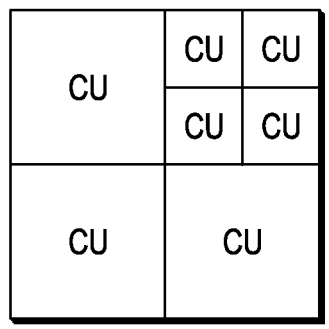

A high-level description of how video data gets encoded and decoded by the encoders 116 and the decoders 138 and 140 in an embodiment of the disclosure will now be provided. In this embodiment, the encoders and decoders operate according to a High Efficiency Video Coding (HEVC) method. HEVC is a block-based hybrid spatial and temporal predictive coding method. In HEVC, an input picture is first divided into square blocks, called LCUs (largest coding units) or CTBs (coding tree blocks), as shown in FIG. 2A. Unlike other video coding standards, in which the basic coding unit is a macroblock of 16×16 pixels, in HEVC, the LCU can be as large as 128×128 pixels. An LCU can be divided into four square blocks, called CUs (coding units), which are a quarter of the size of the LCU. Each CU can be further split into four smaller CUs, which are a quarter of the size of the original CU. The splitting process can be repeated until certain criteria are met. FIG. 3A shows an example of LCU partitioned into CUs. In general, for HEVC, the smallest CU used (e.g., a leaf node as described in further detail below) is considered a CU.

Figure 3B:
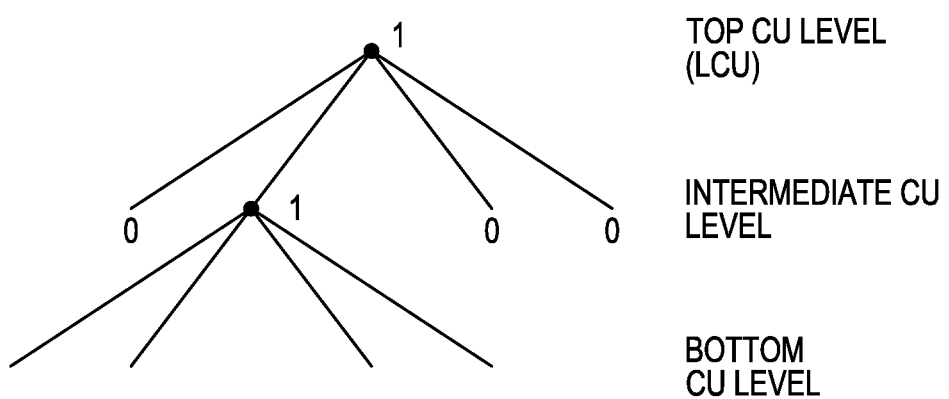

How a particular LCU is split into CUs can be represented by a quadtree. At each node of the quadtree, a flag is set to "1" if the node is further split into sub-nodes. Otherwise, the flag is unset at "0." For example, the LCU partition of FIG. 3A can be represented by the quadtree of FIG. 3B. These "split flags" may be jointly coded with other flags in the video bitstream, including a skip mode flag, a merge mode flag, and a predictive unit (PU) mode flag, and the like. In the case of the quadtree of FIG. 3B, the split flags 10100 could be coded as overhead along with the other flags. Syntax information for a given CU may be defined recursively, and may depend on whether the CU is split into sub-CUs.

Figure 2B:
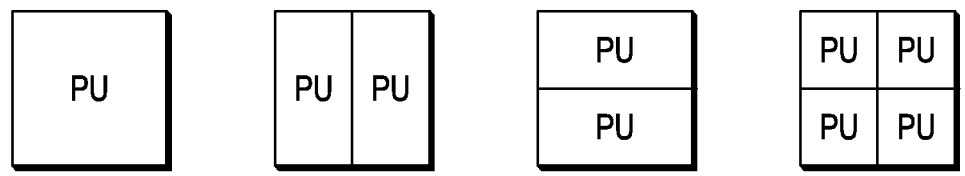

A node that is not split (e.g., a node corresponding a terminal, or "leaf" node in a given quadtree) may include one or more prediction units (PUs). In general, a PU represents all or a portion of the corresponding CU, and includes data for retrieving a reference sample for the PU for purposes of performing prediction for the CU. Thus, at each leaf of a quadtree, a CU of 2N×2N can possess one of four possible patterns (N×N, N×2N, 2N×N and 2N×2N), as shown in FIG. 2B. While shown for a 2N×2N CU, other PUs having different dimensions and corresponding patterns (e.g., square or rectangular) may be used. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s). The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Additionally, a motion vector predictor index may be used to identify a motion vector predictor (e.g., MV of left neighbor, MV of colocated neighbor). Data for the CU defining the one or more PUs of the CU may also describe, for example, partitioning of the CU into the one or more PUs. Partitioning modes may differ between whether the CU is uncoded, intra-prediction mode encoded, or inter-prediction mode encoded.

In general, in intra-prediction encoding, a high level of spatial correlation is present between neighboring blocks in a frame. Consequently, a block can be predicted from the nearby encoded and reconstructed blocks, giving rise to the intra prediction. In some embodiments, the prediction can be formed by a weighted average of the previously encoded samples, located above and to the left of the current block. The encoder may select the mode that minimizes the difference or cost between the original and the prediction and signals this selection in the control data.

In general, in inter-prediction encoding, video sequences have high temporal correlation between frames, enabling a block in the current frame to be accurately described by a region (or two regions in the case of bi-prediction) in the previously coded frames, which are known as reference frames. Inter-prediction utilizes previously encoded and reconstructed reference frames to develop a prediction using a block-based motion estimation and compensation technique.

Following intra-predictive or inter-predictive encoding to produce predictive data and residual data, and following any transforms (such as the 4×4 or 8×8 integer transform used in H.264/AVC or a discrete cosine transform (DCT)) to produce transform coefficients, quantization of transform coefficients may be performed. In some embodiments, any transform operations may be bypassed using e.g., a transform skip mode in HEVC. Quantization generally refers to a process in which transform coefficients are quantized to possibly reduce the amount of data used to represent the coefficients, e.g., by converting high precision transform coefficients into a finite number of possible values. These steps will be discussed in more detail below.

Figure 5A:
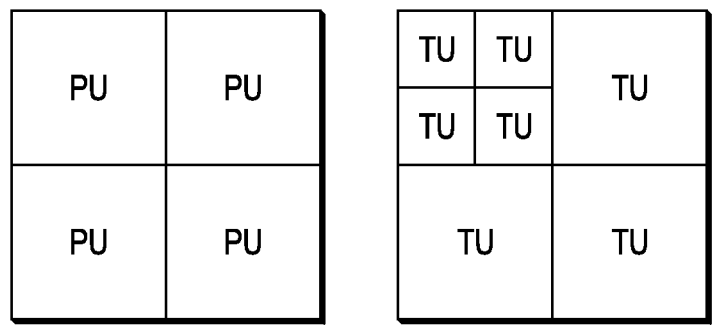
FIGS. 5A and 5B illustrate further video coding principles according to embodiments of the disclosure.
Figure 5B:
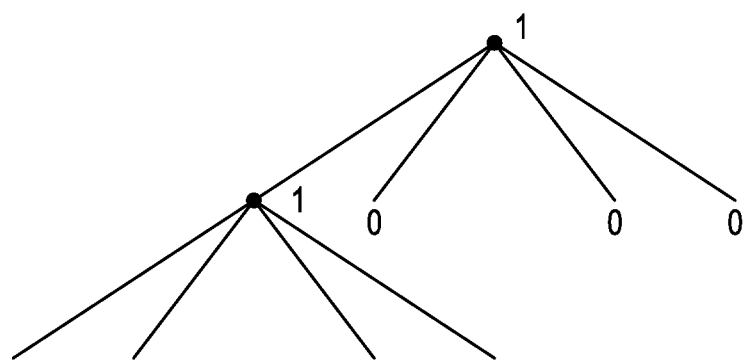

Each CU can also be divided into transform units (TUs). In some embodiments, a block transform operation is performed on one or more TUs, to decorrelate the pixels within the block and compact the block energy into the low order coefficients of the transform block. In some embodiments, one transform of 8×8 or 4×4 may be applied. In other embodiments, a set of block transforms of different sizes may be applied to a CU, as shown in FIG. 5A where the left block is a CU partitioned into PUs and the right block is the associated set of transform units (TUs). The size and location of each block transform within a CU is described by a separate quadtree, called RQT. FIG. 5B shows the quadtree representation of TUs for the CU in the example of FIG. 5A. In this example, 11000 is coded and transmitted as part of the overhead. As is appreciated, CUs, PUs, and TUs may be of N×N in size.

The TUs and PUs of any given CU may be used for different purposes. TUs are typically used for transformation, quantizing and coding operations, while PUs are typically used for spatial and temporal prediction. There is not necessarily a direct relationship between the number of PUs and the number of TUs for a given CU.

Video blocks may comprise blocks of pixel data in the pixel domain, or blocks of transform coefficients in the transform domain, e.g., following application of a transform, such as a discrete cosine transform (DCT), an integer transform, a wavelet transform, or a conceptually similar transform to residual data for a given video block, wherein the residual data represents pixel differences between video data for the block and predictive data generated for the block. In some cases, video blocks may comprise blocks of quantized transform coefficients in the transform domain, wherein, following application of a transform to residual data for a given video block, the resulting transform coefficients are also quantized. In video encoding, quantization is the step that introduces loss, so that a balance between bitrate and reconstruction quality can be established. These steps will be discussed further below.

Block partitioning serves an important purpose in block-based video coding techniques. Using smaller blocks to code video data may result in better prediction of the data for locations of a video frame that include high levels of detail, and may therefore reduce the resulting error (e.g., deviation of the prediction data from source video data), represented as residual data. In general, prediction exploits the spatial or temporal redundancy in a video sequence by modeling the correlation between sample blocks of various dimensions, such that only a small difference between the actual and the predicted signal needs to be encoded. A prediction for the current block is created from the samples which have already been encoded. While potentially reducing the residual data, such techniques may, however, require additional syntax information to indicate how the smaller blocks are partitioned relative to a video frame, and may result in an increased coded video bitrate. Accordingly, in some techniques, block partitioning may depend on balancing the desirable reduction in residual data against the resulting increase in bitrate of the coded video data due to the additional syntax information.

In general, blocks and the various partitions thereof (e.g., sub-blocks) may be considered video blocks. In addition, a slice may be considered to be a plurality of video blocks (e.g., macroblocks, or coding units), and/or sub-blocks (partitions of macroblocks, or sub-coding units such as sub-blocks of PUs, TUs, etc.). Each slice may be an independently decodable unit of a video frame. Alternatively, frames themselves may be decodable units, or other portions of a frame may be defined as decodable units. Furthermore, a GOP, also referred to as a group of pictures, may be defined as a decodable unit.

Figure 4A:
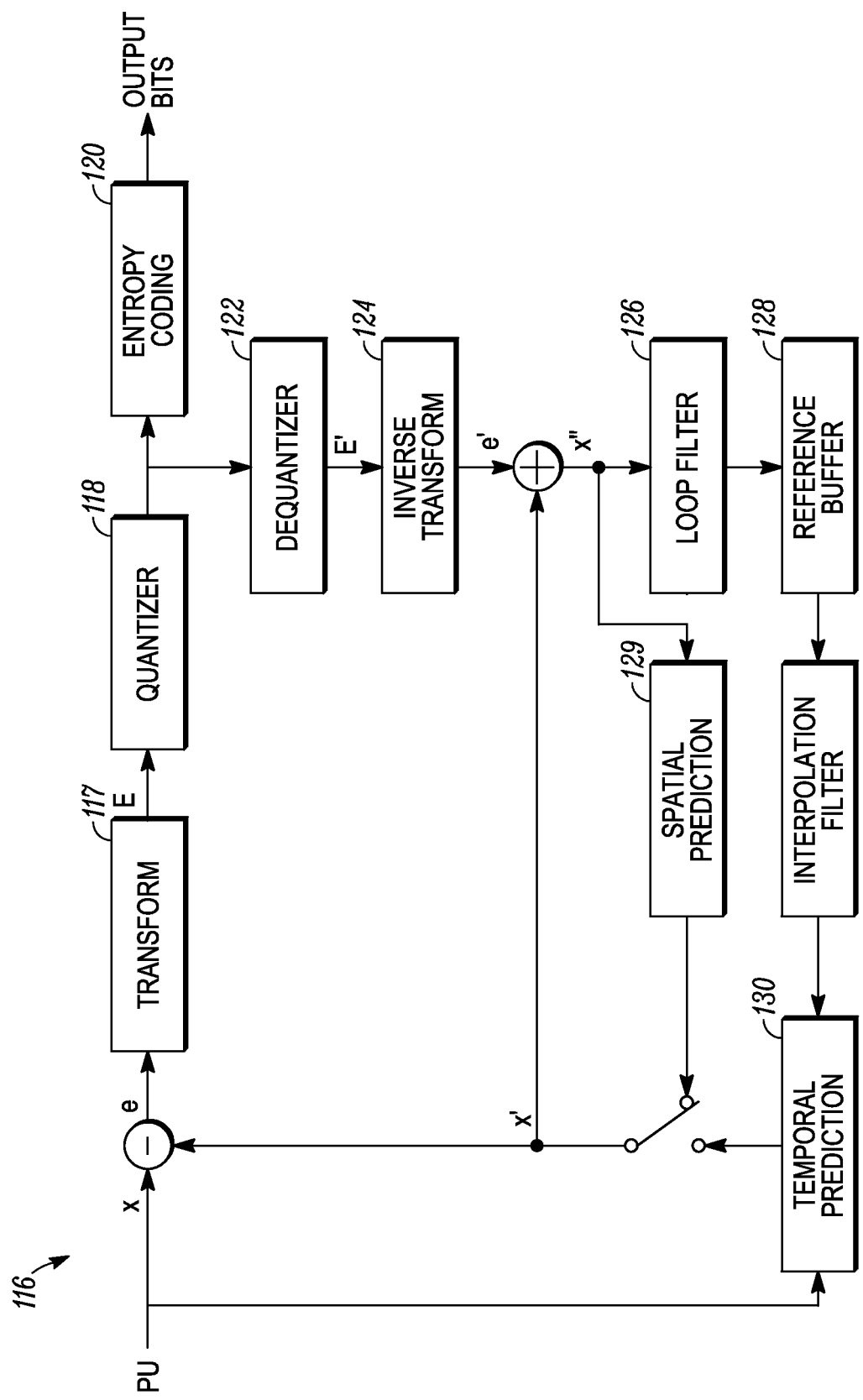
FIGS. 4A and 4B show possible architectures for an encoder and a decoder according to embodiments of the disclosure.

The encoders 116 (FIG. 1A) may be, according to an embodiment of the disclosure, composed of several functional modules as shown in FIG. 4A. These modules may be implemented as hardware, software, or any combination of the two. Given a current PU, x, a prediction PU, x', may first be obtained through either spatial prediction or temporal prediction. This spatial or temporal prediction may be performed by a spatial prediction module 129 or a temporal prediction module 130 respectively.

There are several possible spatial prediction directions that the spatial prediction module 129 can perform per PU, including horizontal, vertical, 45-degree diagonal, 135-degree diagonal, DC, Planar, etc. In general, spatial prediction may be performed differently for luma PU and chroma PU. For example, including the Luma intra modes, an additional mode, called IntraFromLuma, may be used for the Chroma intra prediction mode. A syntax indicates the spatial prediction direction per PU.

The encoder 116 (FIG. 1A) may perform temporal prediction through motion estimation operation. Specifically, the temporal prediction module 130 (FIG. 4A) may search for a best match prediction for the current PU over reference pictures. The best match prediction may be described by motion vector (MV) and associated reference picture (refIdx). Generally, a PU in B pictures can have up to two MVs. Both MV and refIdx may be part of the syntax in the bitstream.

The prediction PU may then be subtracted from the current PU, resulting in the residual PU, e. The residual CU, generated by grouping the residual PU, e, associated with the CU, may then be transformed by a transform module 117, one transform unit (TU) at a time, resulting in the residual PU in the transform domain, E. To accomplish this task, the transform module 117 may use e.g., either a square or a non-square block transform.

Referring back to FIG. 4A, the transform coefficients E, may then be quantized by a quantizer module 118, converting the high precision transform coefficients into a finite number of possible values. The quantization process may reduce the bit depth associated with some or all of the coefficients. For example, an n-bit value may be rounded down to an m-bit value during quantization, where n is greater than m. In some embodiments, external boundary conditions are used to produce modified one or more transform coefficients. For example, a lower range or value may be used in determining if a transform coefficient is given a nonzero value or just zeroed out. As should be appreciated, quantization is a lossy operation and the loss by quantization generally cannot be recovered.

The quantized coefficients may then be entropy coded by an entropy coding module 120, resulting in the final compression bits. The specific steps performed by the entropy coding module 120 will be discussed below in more detail. It should be noted that the prediction, transform, and quantization described above may be performed for any block of video data, e.g., to a PU and/or TU of a CU, or to a macroblock, depending on the specified coding standard.

To facilitate temporal and spatial prediction, the encoder 116 may also take the quantized transform coefficients E and dequantize them with a dequantizer module 122 resulting in the dequantized transform coefficients E'. The dequantized transform coefficients are then inverse transformed by an inverse transform module 124, resulting in the reconstructed residual PU, e'. The reconstructed residual PU, e', is then added to the corresponding prediction, x', either spatial or temporal, to form a reconstructed PU, x".

Referring still to FIG. 4A, a deblocking filter (DBF) operation may be performed on the reconstructed PU, x", first to reduce blocking artifacts. A sample adaptive offset (SAO) process may be conditionally performed after the completion of the deblocking filter process for the decoded picture, which compensates the pixel value offset between reconstructed pixels and original pixels. In some embodiments, both the DBF operation and SAO process are followed by adaptive loop filter functions, which may be performed conditionally by a loop filter module 126 over the reconstructed PU. In some embodiments, the adaptive loop filter functions minimize the coding distortion between the input and output pictures. In some embodiments, loop filter module 126 operates during an inter-picture prediction loop. If the reconstructed pictures are reference pictures, they may be stored in a reference buffer 128 for future temporal prediction.

HEVC specifies two loop filters that are applied in order with the de-blocking filter (DBF) applied first and the sample adaptive offset (SAO) filter applied afterwards. The DBF is similar to the one used by H.264/MPEG-4 AVC but with a simpler design and better support for parallel processing. In HEVC the DBF only applies to an 8×8 sample grid while with H.264/MPEG-4 AVC the DBF applies to a 4×4 sample grid. DBF uses an 8×8 sample grid since it causes no noticeable degradation and significantly improves parallel processing because the DBF no longer causes cascading interactions with other operations. Another change is that HEVC only allows for three DBF strengths of 0 to 2. HEVC also requires that the DBF first apply horizontal filtering for vertical edges to the picture and only after that does it apply vertical filtering for horizontal edges to the picture. This allows for multiple parallel threads to be used for the DBF.

The SAO filter process is applied after the DBF and is made to allow for better reconstruction of the original signal amplitudes by using e.g., a look up table that includes some parameters that are based on a histogram analysis made by the encoder. The SAO filter has two basic types which are the edge offset (EO) type and the band offset (BO) type. One of the SAO types can be applied per coding tree block (CTB). The edge offset (EO) type has four sub-types corresponding to processing along four possible directions (e.g., horizontal, vertical, 135 degree, and 45 degree). For a given EO sub-type, the edge offset (EO) processing operates by comparing the value of a pixel to two of its neighbors using one of four different gradient patterns. An offset is applied to pixels in each of the four gradient patterns. For pixel values that are not in one of the gradient patterns, no offset is applied. The band offset (BO) processing is based directly on the sample amplitude which is split into 32 bands. An offset is applied to pixels in 16 of the 32 bands, where a group of 16 bands corresponds to a BO sub-type. The SAO filter process was designed to reduce distortion compared to the original signal by adding an offset to sample values. It can increase edge sharpness and reduce ringing and impulse artifacts.

In an embodiment of the disclosure, intra pictures (such as an I picture) and inter pictures (such as P pictures or B pictures) are supported by the encoder 116 (FIG. 1A). An intra picture may be coded without referring to other pictures. Hence, spatial prediction may be used for a CU/PU inside an intra picture. An intra picture provides a possible point where decoding can begin. On the other hand, an inter picture generally aims for high compression. Inter picture supports both intra and inter prediction. A CU/PU in inter picture is either spatially or temporally predictive coded. Temporal references are the previously coded intra or inter pictures.

Figure 4B:
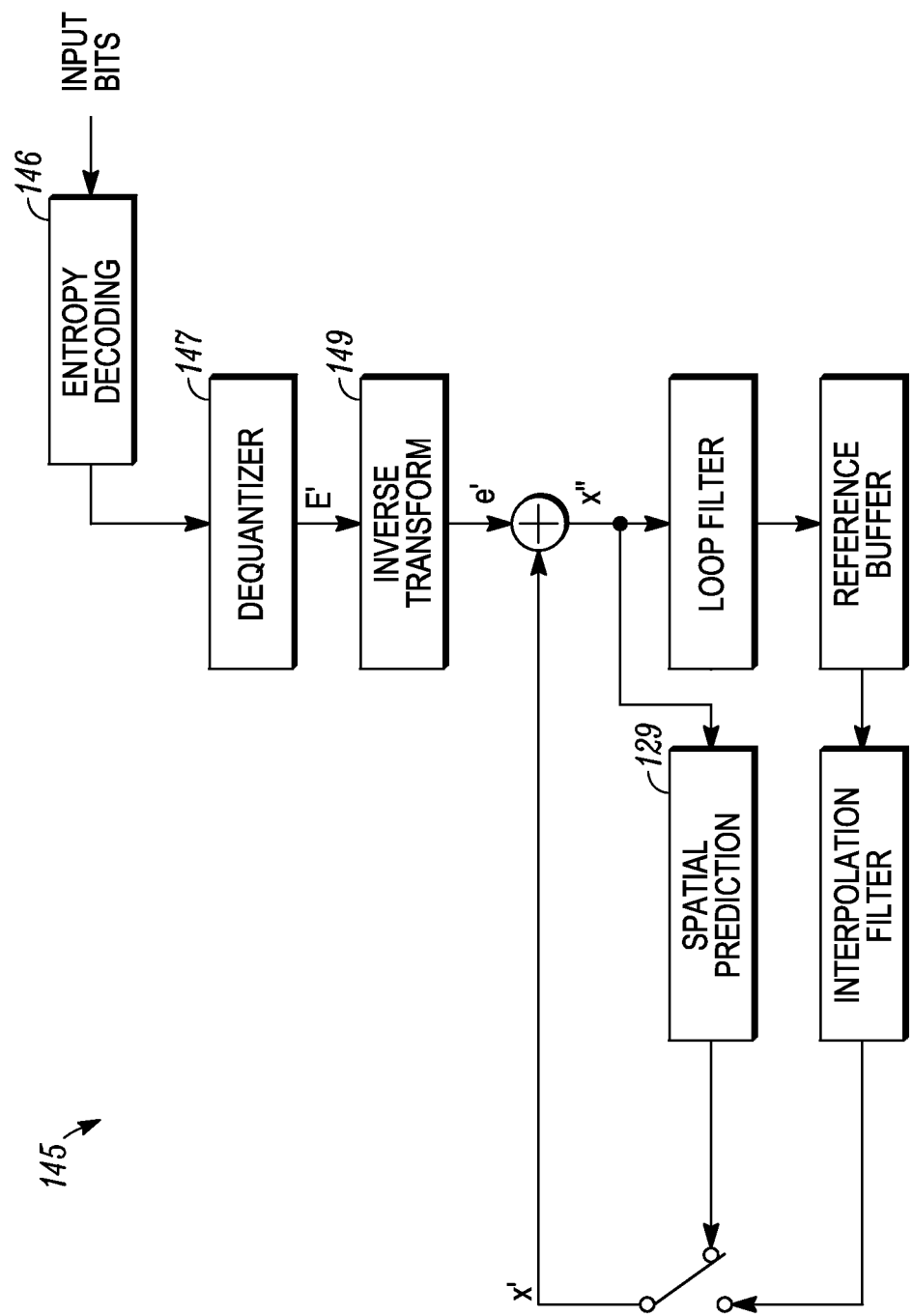

When the decoders 138 and 140 (FIG. 1A) receive the bitstream, they perform the functions shown in e.g., FIG. 4B. An entropy decoding module 146 of the decoder 145 may decode the sign values, significance map and non-zero coefficients to recreate the quantized and transformed coefficients. In decoding the significance map, the entropy decoding module 146 may perform the reverse of the procedure described in conjunction with the entropy coding module 120—decoding the significance map along a scanning pattern made up of scanning lines. The entropy decoding module 146 then may provide the coefficients to a dequantizer module 147, which dequantizes the matrix of coefficients, resulting in E'. The dequantizer module 147 may provide the dequantized coefficients to an inverse transform module 149. The inverse transform module 149 may perform an inverse transform operation on the coefficients resulting in e'. Filtering and spatial prediction may be applied in a manner described in conjunction with FIG. 4A.

Scalable video coding (SVC) is an extension of HEVC. For example, several layers of video could be encoded/decoded in one single SVC bitstream. For simplicity, we assume there are two layers of video, e.g., base layer and enhancement layer, as shown in FIG. 6.

Figure 6:
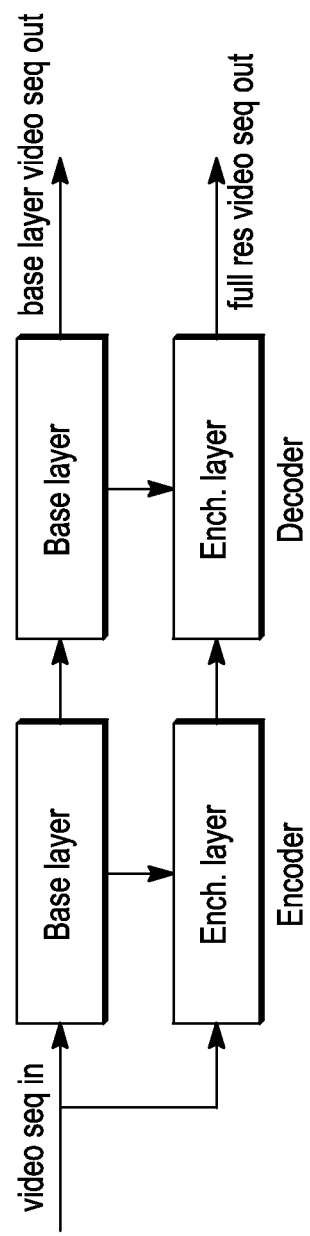
FIG. 6 illustrates an enhancement layer and base layer relationship schematic according to embodiments of the disclosure.

FIG. 6 illustrates a high level description of a scalable coding algorithm having of two layers of coding: a base layer and an enhancement layer. In some embodiments, the base layer codes input video sequence at small resolution and low quality and the enhancement layer codes the input video sequence at full resolution and high quality. The coding information generated from the base layer, such as, reconstructed pixels, MV & refIdx, code mode, etc., may be passed to the enhancement layer. The enhancement layer can then use the coding information passed from base layer to improve the enhancement layer coding performance.

HEVC Intra Mode Prediction

Figure 7:
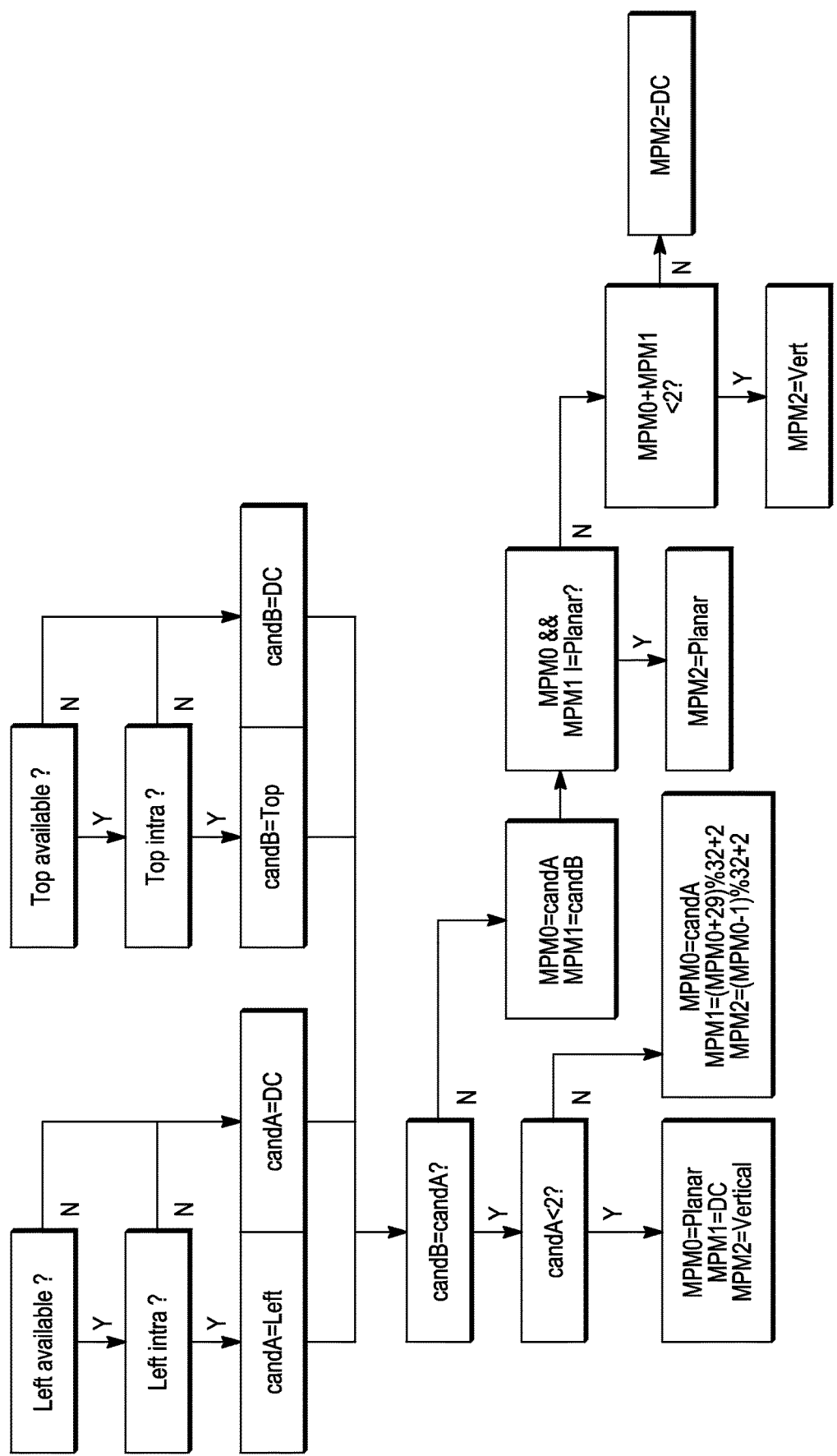
FIG. 7 illustrates further video coding principles according to embodiments of the disclosure.
Figure 8:
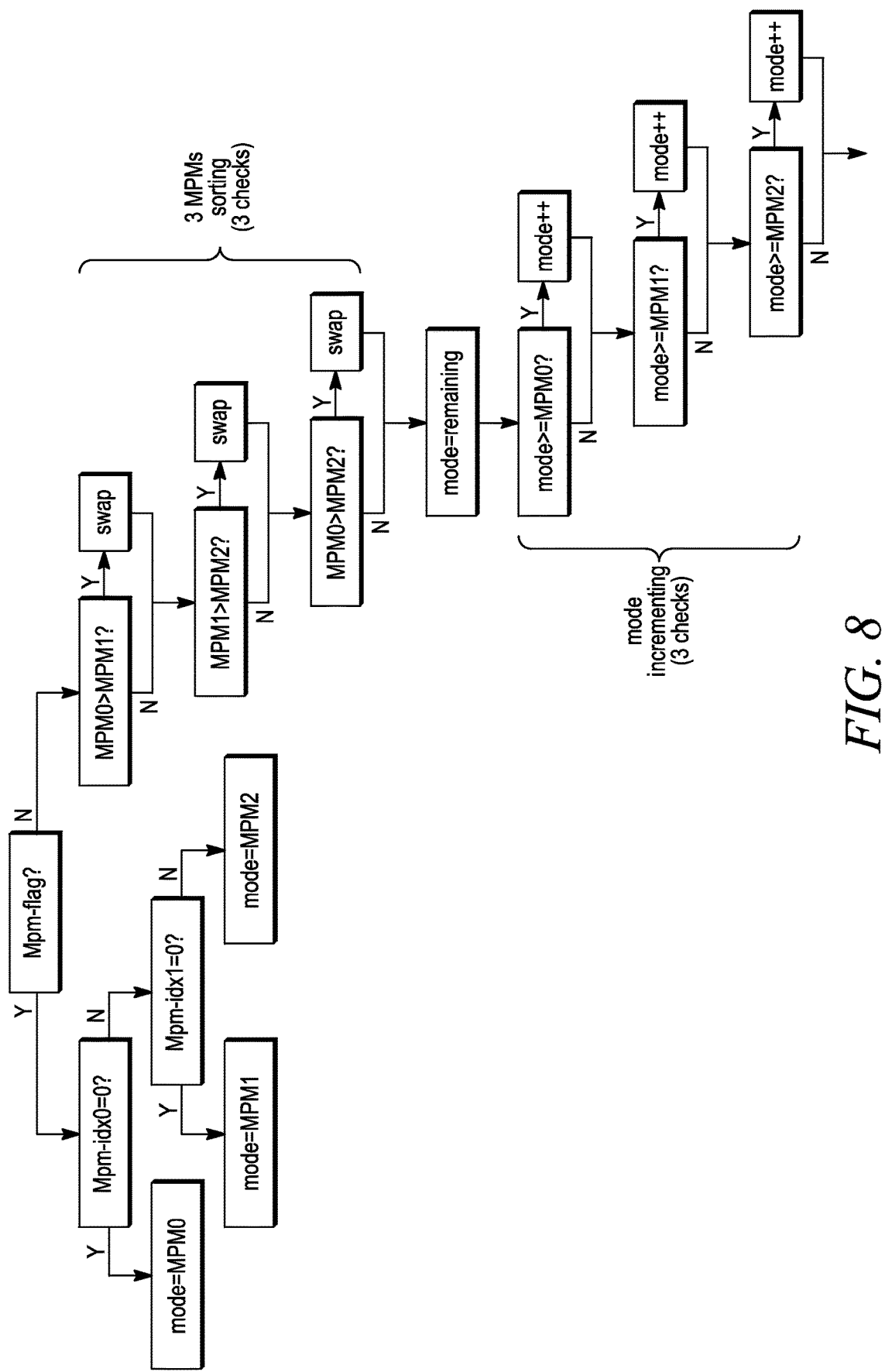
FIG. 8 illustrates further video coding principles according to embodiments of the disclosure.

In HEVC, Intra mode decoding involves two parts: the MPM derivation and a decoding tree. FIG. 7 illustrates an example MPM derivation process and FIG. 8 illustrates an example decoding tree.

As is known in the art, Intra modes for neighboring blocks are highly correlated and for example if a previously-encoded block was predicted using e.g., a mode 2, it is likely that the best mode for current block is also mode 2. To take advantage of this correlation, predictive coding may be used to signal Intra modes.

In some embodiments, for current 4×4 block, a mode is predicted based on the modes of neighboring blocks (e.g., above and left blocks) and this mode is defined as the most probable mode (MPM). In some embodiments, MPM is inferred according to the following rules; if the left neighboring block or the above neighboring block is unavailable, the MPM is set to 2 (DC) or else the MPM is set to the minimum of the prediction mode of left neighboring block and the above neighboring block.

For intra prediction according to each prediction mode, the encoder may use the condition of the MPM with a flag to signal the prediction mode. If the MPM is the same as the prediction mode, the flag is set to "1" and only one bit is needed to signal the prediction mode of intra block in the enhancement layer. When the MPM and prediction mode is different, the flag is set to "0" and additional several bits may be required to signal the intra prediction mode. Thus, an encoder may spend either 1 or several bits to represent the Intra mode.

Base Layer Intra Prediction Mode Use for Enhancement Layer Intra Mode Prediction Since there is a strong correlation between the Intra prediction mode from the base layer and the Intra prediction mode of the enhancement layer, it may be beneficial to use the base layer Intra mode for the enhancement layer Intra mode prediction. For example, in some embodiments, the base Intra prediction mode may be included as one of the most probable modes (MPM) for the enhancement layer Intra prediction mode. In such embodiments, the base layer Intra mode could be added to the MPM candidates. In some embodiments, the base layer Intra mode could be used as one of the MPMs.

In some embodiments, adding or modifying the Intra MPMs for the Intra block so that the current block (e.g., enhancement layer intra mode block) could use the base layer Intra mode may be performed. For example, the current block Intra mode may be specified to be the same as the base layer Intra mode with one or more flag(s) encoded/decoded in the bitstream.

Base Layer Intra Mode Compression

In order to use the base layer Intra prediction mode for the enhancement layer Intra mode prediction, it is desirable to provide memory to store the base layer Intra modes for the enhancement layer to use. Under the current HEVC framework, the worst case is that every 4×4 Intra block could have different Intra prediction mode. In order to save the memory, the Intra mode may be compressed to a representative 4×4 Intra block.

Thus, for some base layer neighboring 4×4 Intra blocks, the Intra prediction modes could be different. When the Intra prediction modes are used for the enhancement layer Intra mode prediction, a representative base layer neighboring 4×4 Intra block could be regarded as using the same Intra prediction mode.

For example, for one 16×16 base layer Intra block, there are 16 4×4 Intra blocks and there could be 16 different base layer Intra prediction modes. When the base layer Intra prediction modes are used for enhancement layer Intra mode prediction, only one base layer Intra prediction mode could be stored and used. That Intra prediction mode could be the Intra prediction mode from the top-left 4×4 block in that 16×16 block, or it could be the Intra prediction mode from the bottom right 4×4 block in that 16×16 block, or it could from any other 4×4 block in that 16×16 block or it could be derived from the Intra modes of the 4×4 blocks in that 16×16 block. For example, it could the majority of the 4×4 Intra modes in that 16×16 block.

In some embodiments, the base layer block could be an Intra block or it could be an Inter block, or a mixture of Inter and Intra blocks. The base layer block size could be 8×8, 32×32 or any other sizes.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent exemplary embodiments of the disclosure and are therefore representative of the subject matter which is broadly contemplated by the present disclosure. It is further understood that the scope of the present disclosure fully encompasses other embodiments and that the scope of the present disclosure is accordingly limited by nothing other than the appended claims.

What is claimed is:

1. A method of providing enhancement layer intra mode prediction for video coding of a bitstream, the method comprising:
    (a) providing base layer intra mode in a base layer of a two layer video encoder;
    (b) adding the base layer intra mode as one of a plurality of most probable mode (MPM) candidates for enhancement layer intra mode prediction; and
    (c) compressing the base layer intra mode and storing the compressed base layer intra mode, wherein a single compressed base layer intra mode in storage used for base layer intra mode is also selectable enhancement layer intra mode predictions;
    (d) selecting from the plurality of most probable mode candidates an enhancement layer intra mode for the enhancement layer of the video encoder based on a flag set encoded and/or decoded in to the bitstream,
    wherein when said flag set indicates the base layer intra mode is selected from the plurality of MPM candidates for the enhancement layer, the compressed base layer intra mode is used as a mode for a current video block of the base layer for applying directly as the enhancement layer intra mode.

2. The method of claim 1, wherein the MPMs include a left neighboring block and an above neighboring block.

3. The method of claim 1, wherein the method is implemented on a computer having a processor and a memory coupled to said processor, wherein at least some of steps (a)-(c) are performed using said processor.

4. A method of providing enhancement layer intra mode prediction for video decoding, the method comprising:
    (a) providing base layer intra mode in a base layer of a two layer video decoder;
    (b) adding the base layer intra mode as one of a plurality of most probable modes (MPM) candidates for enhancement layer intra mode prediction; and
    (c) selecting from the plurality of most probable mode candidates an enhancement layer intra mode for the enhancement layer of the video encoder based on a flag set encoded and/or decoded in to the bitstream,
    wherein when the base layer intra mode is selected from the plurality of MPM candidates for the enhancement layer, the base layer intra mode is used as a mode for a current video block of the base layer for applying directly as the enhancement layer intra mode; and decoding a compressed base layer intra mode from storage, wherein said compressed base layer intra mode stored is a single mode used for base layer intra mode and is selectable for the enhancement layer intra mode prediction.

5. The method of claim 4, further comprising: (d) selecting two or more MPMs from the set of a plurality of MPMs to use in step (c).

6. The method of claim 4, wherein the method is implemented on a computer having a processor and a memory coupled to said processor, wherein at least some of steps (a)-(c) are performed using said processor.

7. An apparatus for decoding a video bitstream having a plurality of pictures, the apparatus comprising a video decoder, the video decoder comprising:
    a processor; and
    a memory connected to the processor, the memory storing code enabling the processor to be configured to:
    (a) receive a video bitstream;
    (b) derive processed video data from the bitstream, wherein the processed video data includes a base layer intra mode in a base layer of a two layer video encoder;
    (c) use the base layer intra mode as one of a plurality of most probable modes (MPMs); and
    (d) select from the plurality of most probable mode candidates an enhancement layer intra mode for the enhancement layer of the two layer video encoder based on a flag set encoded and/or decoded in to the bitstream,
    wherein when the base layer intra mode is selected from the plurality of MPM candidates, the base layer intra mode is used as a mode for a current video block of the base layer for applying directly as the enhancement layer intra mode.

8. An apparatus for encoding a video bitstream having a plurality of pictures, the apparatus comprising a video encoder, the video encoder comprising:
    a processor; and
    a memory connected to the processor, the memory storing code enabling the processor to be configured to:
    (a) receive a video bitstream;
    (b) derive processed video data from the bitstream, wherein the processed video data includes a base layer intra mode in a base layer of a two layer video encoder;
    (c) use the base layer intra mode to a set of a plurality of most probable modes (MPMs) when a flag is set in a first state; and
    (d) compress the base layer intra mode and storing the compressed base layer intra mode, wherein a single compressed base layer intra mode in storage used for base layer intra mode is also selectable enhancement layer intra mode predictions;
    (e) select from the plurality of most probable mode candidates an enhancement layer intra mode for the enhancement layer of the video encoder based on a flag set encoded and/or decoded in to the bitstream,
    wherein when the base layer intra mode is selected from the plurality of MPM candidates for the enhancement layer, the base layer intra mode is used as a mode for a current video block of the base layer for applying directly as the enhancement layer intra mode.

* * * * *